Dec. 23, 1930.   H. W. BUNDY   1,785,762
TINNING APPARATUS
Filed Dec. 4, 1925
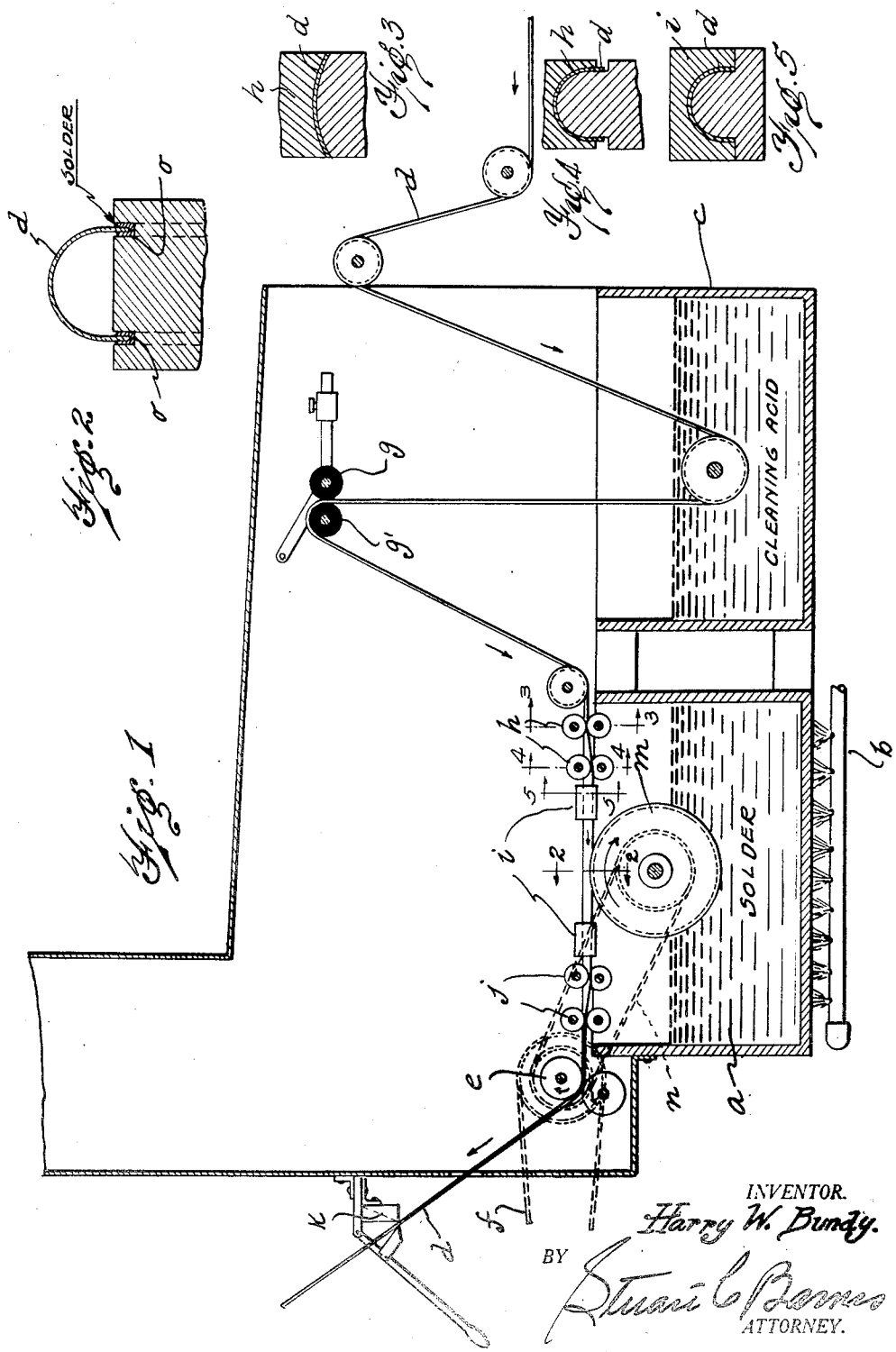
INVENTOR.
Harry W. Bundy.
BY
Stuart C. Barnes
ATTORNEY.

Patented Dec. 23, 1930

1,785,762

UNITED STATES PATENT OFFICE

HARRY W. BUNDY, OF DETROIT, MICHIGAN, ASSIGNOR, BY MESNE ASSIGNMENTS, TO BUNDY TUBING COMPANY, OF DETROIT, MICHIGAN, A CORPORATION OF MICHIGAN

TINNING APPARATUS

Application filed December 4, 1925. Serial No. 73,116.

This invention relates to an apparatus for tinning the edges of strip stock and has for its object a construction which permits the application of a ribbon-like coating of solder of uniform width along the edges of a moving piece of continuous strip stock. Another object is a novel construction of the means for feeding the solder to the strip stock.

Another object is the means whereby the stock is guided through the solder bath in such a way as to simultaneously coat both edges of the moving strip stock with solder.

In the drawings:

Fig. 1 is a side elevation of my apparatus, parts of the same being shown in section.

Fig. 2 is a section on the line 2—2 of Fig. 1.

Figs. 3, 4 and 5 are sectional views taken on lines 3—3, 4—4 and 5—5, respectively, of Fig. 1, showing the forming rolls and the guiding die.

$a$ designates a solder tank in which the solder is maintained in a molten condition with the use of a burner $b$ of any standard construction placed beneath the tank. Adjacent the solder tank is another tank $c$ for containing a cleaning acid.

The strip stock $d$ is fed through the machine at a uniform rate of speed, the stock being moved by a plurality of driving rolls, one of which is shown in Fig. 1 at $e$, and the driving belt $f$ connected with this driving roll and to any suitable source of power. This moving stock is first conducted through the cleaning acid in the tank $c$ and then runs upwardly between the rolls $g$ and $g'$ and is then led over the top of the solder tank. First, it is fed through the forming rolls $h$ which form the strip stock in the shape as shown in Fig. 2, substantially U-shaped in cross section. The stock which now has been bowed transversely is fed through the guiding dies $i$ thence through the forming rolls $j$ which flatten out the strip stock to its original shape. The same is then pulled through scraping dies $k$ for removing any surplus solder, which is applied to the strip stock in a way that will now be described.

Mounted in the solder tank is a solder feed roll $m$ driven through a belt or chain $n$ connected with the driving mechanism of the machine. This solder feed roll is provided with one or more circumferential grooves $o$, these grooves being relatively narrow and having a width slightly in excess of the thickness of the strip stock. This solder feed roll is partially immersed in the molten solder and when rotated will carry solder with it in these grooves, the solder being held therein by capillary action. The guiding dies $i$ so guide the moving stock that the edges of this stock are guided in the grooves carried by the feed roll and consequently pass through the solder held within the grooves. It is found that the solder held within these grooves by capillary action will have a constant depth and as the stock is positively guided in the grooves the moving strip stock will be coated with a ribbon-like coating of solder extending lengthwise of said stock along each edge, and it is found that the width of this ribbon-like coating is practically uniform throughout.

One of the advantages of using this solder feed roll is that the level of the solder in the tank may vary within quite wide limits as the feed roll picks up the solder and raises the same into contact with the moving strip stock, it being necessary that the feed roll be partially immersed in the solder at all times, the grooves being so designed as to carry a definite amount of solder by capillary action. Another advantage is that it is possible to apply ribbon-like coatings to both edges of the strip stock simultaneously, due to the fact that the stock is bowed or formed with the edges bent downwardly so as to engage in grooves carried by the solder feed wheel. Obviously with such a feed mechanism for feeding uniform streams of solder to the strip stock, as many streams of solder as necessary could be fed to the moving strip stock. The width of the coating can be varied within certain limits by changing the depth of the grooves in the feed roll. Preferably I drive the solder feed roll in the opposite direction as the stock, but practically as good results may be obtained by driving the solder feed roll in the same direction as the stock.

The cross-sectional configuration of the bent strip stock may be varied as desired as it may have a central rib in addition to the turned down edges. The number of grooves on said solder feed roll may be increased, depending on the number of ribbon-like coatings desired on the strip stock.

What I claim is:

1. An apparatus for the purpose specified, having in combination, means for moving a piece of strip stock, a tank for containing molten solder, a solder feed roll partly immersed in said solder and provided with a circumferential groove, means for rotating said roll whereby the solder is rased by being retained in the groove above the surface of the solder by capillary action, and means for guiding said strip stock to engage an edge of said strip stock in said circumferential groove at a point substantially above the surface of the solder in the tank for the purpose of forming a ribbon-like coating along the edge of the stock and which runs lengthwise of the stock.

2. An apparatus for the purpose specified, having in combination, means for moving a piece of strip stock, a tank for containing molten solder, a solder feed roll partially immersed in said solder and provided with one or more circumferential grooves, means for transversely bowing said strip stock, means for guiding one or more edges of the bowed strip stock into engagement with the groove or grooves in said feed roll, and means for rotating said feed roll to raise the solder in said groove or grooves by capillary action for the purpose of forming a ribbon-like coating of solder along one or more edges of said strip stock.

3. An apparatus for the purpose specified, having in combination, means for moving a piece of strip stock, a tank for containing molten solder, a solder feed roll partially immersed in said solder and provided with a relatively narrow circumferential groove, means for guiding said strip stock for guiding an edge of the stock into engagement with said relatively narrow circumferential groove in said feed roll, and means for rotating said feed roll to raise the solder in the groove by capillary action for the purpose of forming a ribbon-like coating of solder along the edge of said strip stock.

4. An apparatus for the purpose specified, having in combination, means for longitudinally moving a piece of strip stock, means for transversely bowing said strip stock while so moving, a tank for solder, a solder feed roll partially immersed in said tank and provided with a pair of circumferential grooves spaced apart, means for rotating said feed roll thereby raising the solder in said grooves above the surface of the solder in the tank by capillary action, and means for guiding said moving and bowed strip stock to guide the edges thereof into said grooves carried by the feed roll for the purpose of forming a ribbonlike coating of solder of uniform width along the edges of said strip stock.

5. An apparatus for the purpose specified comprising in combination, means for moving strip stock, means providing a supply of molten solder, and solder feeding means for feeding solder to the moving strip stock, said means consisting of a device provided with a solder retaining groove for feeding solder held in the groove of an appreciable depth, said feeding means and stock being so disposed that a part of the stock extends into the groove as it moves whereby a coating of solder is applied to that part of the stock which extends into the groove.

In testimony whereof I have affixed my signature.

HARRY W. BUNDY.